No. 628,326. Patented July 4, 1899.
B. F. HOUGH.
BELT FASTENER.
(Application filed Jan. 26, 1898.)
(No Model.)

Witnesses
T. W. O'Riley,
Chas. P. Brock.

Inventor
Benj. F. Hough,
By
O'Mara Leo
Attorneys

THE NORRIS PETERS CO., PHOTO-LITHO., WASHINGTON, D. C.

UNITED STATES PATENT OFFICE.

BENJAMIN F. HOUGH, OF WILMERDING, PENNSYLVANIA, ASSIGNOR OF ONE-HALF TO P. H. KEEFE, OF SHARPSBURG, PENNSYLVANIA.

BELT-FASTENER.

SPECIFICATION forming part of Letters Patent No. 628,326, dated July 4, 1899.

Application filed January 26, 1898. Serial No. 668,092. (No model.)

*To all whom it may concern:*

Be it known that I, BENJAMIN F. HOUGH, a citizen of the United States, residing at Wilmerding, in the county of Allegheny and State of Pennsylvania, have invented a new and useful Belt-Fastener, of which the following is a specification.

My invention is in the nature of a fastener for uniting the edges of rubber, leather, or other driving-belts, the object of my invention being to provide a device of this class which shall be simple, cheap, durable, and effective, will unite the ends of the belt tightly and firmly together, can be inserted and removed quickly and easily, will offer no obstruction to the running of the belt over drums or pulleys, and will greatly facilitate the operation of taking up slack in the belt due to the stretching from continuous use.

With this object in view my invention consists in a belt-fastening made of a single piece of elastic wire, those portions which are to lie upon the faces of the belt being flattened, while the parts to occupy the holes in the ends of the belt will remain of the original form of the wire, one of the flat portions being provided with an opening, through which the projecting end of one of the round portions formed into a catch or hook will engage when the joint is completed.

My invention further consists in the improved construction, arrangement, and combination of parts hereinafter fully described and afterward specifically pointed out in the appended claim.

In order to enable others skilled in the art to which my invention most nearly appertains to make and use the same, I will now proceed to describe its construction and operation, reference being had to the accompanying drawings, forming part of this specification, in which—

Figure 1:
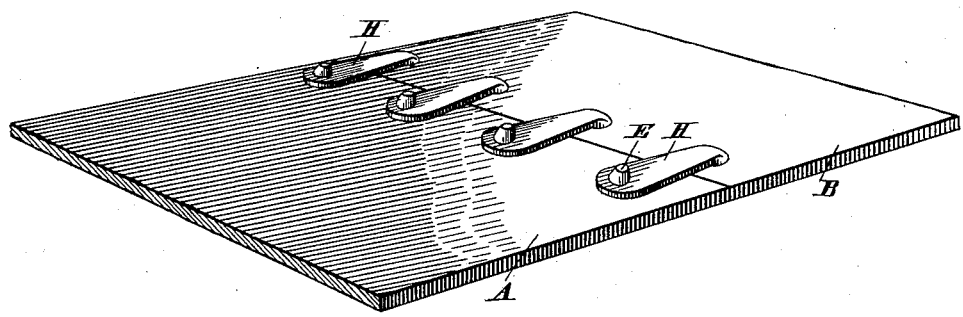
Figure 3:
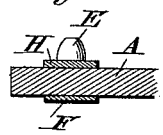
Figure 2:
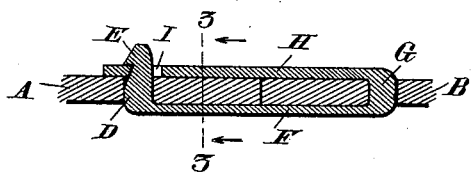
Figure 5:
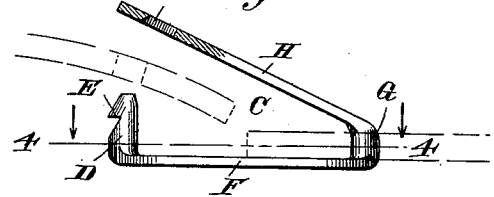
Figure 4:
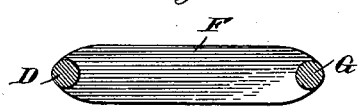
Figure 6:
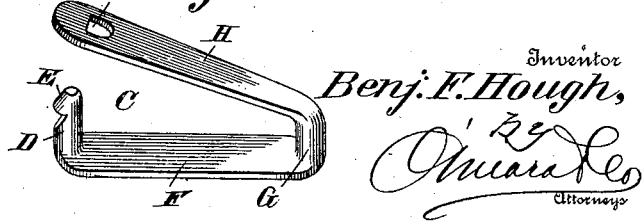

Figure 1 is a perspective view of the two ends of a belt joined together with fasteners constructed in accordance with my invention. Fig. 2 is a longitudinal section through the abutting ends of the belt and one of my fasteners therein. Fig. 3 is a transverse sectional view on the line 3 3 of Fig. 2, looking in the direction of the arrow. Fig. 4 is a sectional view on the line 4 4 of Fig. 5, the end of the belt being omitted. Fig. 5 is a detail view in elevation, partly in section, illustrating the manner in which my improved fastening is applied to one end of the belt ready to receive the opposite end. Fig. 6 is a detail perspective view of the fastener detached.

Like letters of reference mark the same parts wherever they occur in the various figures of the drawings.

Referring to the drawings by letters, A and B indicate the two ends of a belt, which are to be secured together. C indicates my improved fastener, which is made of a single piece of elastic wire, one end D being left round, of a length slightly greater than the thickness of the belt to be fastened, and shaped to form a catch E. The adjoining portion of the wire, as at F, is flattened. A round section is left at G, and from this round section to the end the wire is again flattened, as at H, a hole being formed, as at I, to pass over and engage the latch E on the end D.

The construction of my invention will be readily understood from the foregoing description, and its operation may be described as follows: A suitable number of holes being punched in each of the abutting ends of the belt, the end D of the fastener is passed from the outside inward through the hole in one of the sections, as B, the flat portion F pushed through the hole, and the round portion pushed into the hole, where it remains, as clearly shown in Fig. 5. The end A of the belt is now passed between the latch E and the flat outer portion H of the fastener and pressed downward upon the end D until the latch E projects beyond its upper surface. The outer flat portion H is then pressed downward, the latch E passing through the opening I, when, by reason of the elasticity of the end D, the latch E will engage the outer edge of the hole I, thus firmly securing the parts together.

As many of these fasteners may be applied to the ends of the belt as are considered necessary to make the joint sufficiently strong and rigid, and when the joint is made, no matter how many fasteners are used, the running of the belt will be in no wise interfered with, the flat sections F of the fasteners being elastic and sufficiently thin to form no obstruction.

By the use of my invention all kinds of driving-belts may be quickly and easily fastened together, and when it is desired to take up the slack of the belt, due to stretching from long-continued use, one section, as at A, is removed by pressing the leather of the belt against the outside of the stem D of the fastener, which will disengage the latch E from the outer edge of the hole I and permit the flat portion H to spring off the latch or be removed therefrom with the fingers. Enough of the section A is now cut off to take up the slack, new holes are punched therein, and said section is again sacured to said end, and the end is then secured to the end B in the manner hereinbefore described, all of which can be done without the use of any tools, except the punch to make a hole in the leather.

While I have illustrated and described what I consider to be efficient means for carrying out my invention, I do not wish to be understood as restricting myself to the exact construction shown, but hold that any slight changes, such as might suggest themselves to the ordinary mechanic, would properly fall within the limit and scope of my invention.

Having thus fully described my invention, what I claim as new, and desire to secure by Letters Patent, is—

As an article of manufacture a belt-fastener formed from a single piece of spring metal and comprising a stud having a beveled head and catch at its upper end, a flat member connected to the lower end of the stud and a connecting member arranged at the opposite end of the flat member, and the fastening member extending from the opposite end of the connecting member and having a perforation adjacent to its free end adapted to be sprung over a fastener upon the beveled head and catch of the stud, said stud being capable of a limited movement, whereby the said fastening member can be made to engage and disengage the same, substantially as shown and described.

BENJAMIN F. HOUGH.

Witnesses:
HENRY STEIN,
T. J. McGIVERN.